(12) United States Patent
Fu et al.

(10) Patent No.: US 11,387,953 B2
(45) Date of Patent: *Jul. 12, 2022

(54) METHOD AND APPARATUS FOR ALLOCATING HARQ-ACK CHANNEL RESOURCES SUPPORTING TRANSMIT DIVERSITY AND CHANNEL SELECTION

(71) Applicant: Samsung Electronics Co., Ltd., Suwon-si (KR)

(72) Inventors: Jingxing Fu, Beijing (CN); Yingyang Li, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 11 days.

This patent is subject to a terminal disclaimer.

(21) Appl. No.: 16/921,745

(22) Filed: Jul. 6, 2020

(65) Prior Publication Data

US 2020/0336257 A1    Oct. 22, 2020

Related U.S. Application Data

(63) Continuation of application No. 16/357,065, filed on Mar. 18, 2019, now Pat. No. 10,708,008, which is a
(Continued)

(30) Foreign Application Priority Data

Apr. 20, 2012    (CN) .......................... 201210119285.1

(51) Int. Cl.
    *H04L 1/18*      (2006.01)
    *H04L 5/00*      (2006.01)
    *H04W 72/04*     (2009.01)

(52) U.S. Cl.
CPC ............ *H04L 1/1861* (2013.01); *H04L 5/001* (2013.01); *H04L 5/0055* (2013.01); *H04W 72/042* (2013.01); *H04W 72/0413* (2013.01)

(58) Field of Classification Search
CPC ....... H04L 1/1861; H04L 1/18; H04L 1/1212; H04L 1/1822; H04L 1/1864; H04L 5/00;
(Continued)

(56) References Cited

U.S. PATENT DOCUMENTS 8,259,602 B2    9/2012   Kim et al.
8,488,549 B2    7/2013   Yang et al.
(Continued)

FOREIGN PATENT DOCUMENTS

EP            2618515 A2    7/2013
WO      2011103365 A1    8/2011
(Continued)

OTHER PUBLICATIONS

International Search Report dated Jul. 15, 2013 in connection with International Patent Application No. PCT/KR2013/003235, 3 pages.
(Continued)

*Primary Examiner* — Warner Wong

(57) ABSTRACT

Examples of the present invention provide a method for allocating Hybrid Automatic Repeat Request Acknowledgement (HARQ-ACK) channel resources supporting transmit diversity and channel selection. The method includes: receiving, by a UE, Physical Downlink Control Channel (PDCCH) information and Physical Downlink Shared Channel (PDSCH) data from a base station through two Carrier Components (CCs); obtaining, by the UE according to specific indication information, Physical Uplink Control Channel (PUCCH) channel resources required for transmitting HARQ-ACK feedback information using a transmit diversity technique; and transmitting, by the UE, the HARQ-ACK feedback information on the obtained PUCCH channel resources adopting the transmit diversity technique. According to the method provided by the examples of the present invention, it is possible to allocate HARQ-ACK channel
(Continued)

resources to the UE reasonably and avoid waste of channel resources in the premise that channel selection and SORTD technique are supported.

20 Claims, 2 Drawing Sheets

Related U.S. Application Data continuation of application No. 15/714,978, filed on Sep. 25, 2017, now Pat. No. 10,237,024, which is a continuation of application No. 14/395,805, filed as application No. PCT/KR2013/003235 on Apr. 17, 2013, now Pat. No. 9,774,422.

(58) Field of Classification Search
CPC ..... H04L 5/0001; H04L 5/001; H04L 5/0003; H04L 5/0005; H04L 5/0053; H04W 72/0413; H04W 72/04; H04W 72/042; H04W 72/0406
See application file for complete search history.

(56) References Cited

U.S. PATENT DOCUMENTS

| | | | |
|---|---|---|---|
| 8,553,671 B2 | 10/2013 | Kim et al. | |
| 8,619,693 B2 | 12/2013 | Noh et al. | |
| 8,755,343 B2 | 6/2014 | Han et al. | |
| 8,891,348 B2 | 11/2014 | Yang et al. | |
| 9,025,436 B2 | 5/2015 | Oizumi et al. | |
| 9,042,327 B2 | 5/2015 | Yang et al. | |
| 9,055,574 B2 | 6/2015 | Ahn et al. | |
| 9,161,349 B2 | 10/2015 | Yang et al. | |
| 9,386,565 B2 | 7/2016 | Yang et al. | |
| 9,407,404 B2 | 8/2016 | Xi et al. | |
| 9,455,815 B2 | 9/2016 | Papasakellariou et al. | |
| 9,485,060 B2 | 11/2016 | Nayeb Nazar et al. | |
| 9,572,138 B2 | 2/2017 | Lee et al. | |
| 9,615,381 B2 | 4/2017 | Ahn et al. | |
| 9,648,586 B2 | 5/2017 | Han et al. | |
| 9,941,743 B2 | 4/2018 | Peralta et al. | |
| 2010/0202332 A1* | 8/2010 | Iwagami ............ H04W 52/325 370/311 | |
| 2011/0026631 A1 | 2/2011 | Zhang et al. | |
| 2011/0045860 A1 | 2/2011 | Nam et al. | |
| 2011/0090825 A1 | 4/2011 | Papasakellariou et al. | |
| 2011/0096745 A1* | 4/2011 | Ahn ........................ H04L 5/001 370/329 | |
| 2011/0142000 A1 | 6/2011 | Han et al. | |
| 2011/0170489 A1* | 7/2011 | Han ..................... H04B 7/0671 370/328 | |
| 2011/0235599 A1 | 9/2011 | Nam et al. | |
| 2011/0243036 A1 | 10/2011 | Kenington et al. | |
| 2011/0243066 A1 | 10/2011 | Nayeb Nazar et al. | |
| 2011/0249656 A1 | 10/2011 | Cai et al. | |
| 2011/0310986 A1 | 12/2011 | Heo et al. | |
| 2012/0039279 A1 | 2/2012 | Chen et al. | |
| 2012/0063400 A1 | 3/2012 | Papasakellariou et al. | |
| 2012/0082157 A1 | 4/2012 | Yamada et al. | |
| 2012/0099545 A1 | 4/2012 | Han et al. | |
| 2012/0113831 A1* | 5/2012 | Pelletier ............... H04L 5/0058 370/252 | |
| 2012/0269138 A1 | 10/2012 | Han et al. | |
| 2012/0289170 A1 | 11/2012 | Li et al. | |
| 2012/0320848 A1 | 12/2012 | Chen et al. | |
| 2013/0170462 A1 | 7/2013 | Seo et al. | |
| 2013/0182676 A1* | 7/2013 | Lee ........................ H04L 5/001 370/329 | |
| 2013/0235829 A1* | 9/2013 | Pani ..................... H04L 1/1812 370/329 | |
| 2013/0242799 A1 | 9/2013 | Yin et al. | |
| 2013/0242890 A1 | 9/2013 | He et al. | |
| 2013/0272189 A1 | 10/2013 | Lee et al. | |
| 2013/0286990 A1 | 10/2013 | Park et al. | |
| 2013/0308550 A1 | 11/2013 | Yin et al. | |
| 2013/0322355 A1 | 12/2013 | Seo et al. | |
| 2013/0329688 A1 | 12/2013 | Yang et al. | |
| 2014/0169319 A1* | 6/2014 | Yang ..................... H04L 5/0055 370/329 | |
| 2014/0177540 A1* | 6/2014 | Novak .................. H04L 1/1861 370/329 | |
| 2014/0219201 A1* | 8/2014 | Xu ........................ H04L 5/0055 370/329 | |
| 2014/0226591 A1 | 8/2014 | Han et al. | |
| 2014/0233503 A1* | 8/2014 | Aiba ..................... H04W 76/10 370/329 | |
| 2014/0233506 A1* | 8/2014 | Papasakellariou .... H04L 5/0053 370/329 | |
| 2014/0293909 A1* | 10/2014 | Xu ........................ H04B 7/2656 370/329 | |
| 2014/0334395 A1* | 11/2014 | Lee ........................ H04L 5/0055 370/329 | |
| 2015/0078225 A1 | 3/2015 | Yang et al. | |
| 2015/0110022 A1* | 4/2015 | Liu ........................ H04L 5/0055 370/329 | |
| 2015/0163771 A1* | 6/2015 | Kim ........................ H04L 5/0053 370/329 | |
| 2015/0215964 A1 | 7/2015 | Damnjanovic et al. | |
| 2015/0334741 A1 | 11/2015 | Yang et al. | |
| 2016/0028511 A1 | 1/2016 | Papasakellariou et al. | |
| 2016/0211962 A1 | 7/2016 | Lee et al. | |
| 2016/0286547 A1 | 9/2016 | Yang et al. | |
| 2017/0013612 A1* | 1/2017 | Nayeb Nazar .... H04W 72/0446 | |
| 2018/0234962 A1* | 8/2018 | Kim ..................... H04L 5/0035 | |
| 2021/0084645 A1* | 3/2021 | Papasakellariou ............................ H04W 72/1263 | |

FOREIGN PATENT DOCUMENTS

| | | |
|---|---|---|
| WO | 2011124129 A1 | 10/2011 |
| WO | 2012024222 A2 | 2/2012 |
| WO | 2012033366 A2 | 3/2012 |
| WO | 2012036457 A2 | 3/2012 |
| WO | 2012036473 A2 | 3/2012 |
| WO | 2012050342 A2 | 4/2012 |
| WO | 2012050389 A1 | 4/2012 |

OTHER PUBLICATIONS

Written Opinion of the International Searching Authority dated Jul. 15, 2013 in connection with International Patent Application No. PCT/KR2013/003235, 4 pages.
European Search Report issued for EP 13777659.7 dated Nov. 4, 2015, 7 pgs.
Samsung, "Discussion on Transmit Diversity for PUCCH Format 1b With Channel Selection", 3GPP TSG RAN WG1 #66, Athens, Greece, Aug. 22-26, 2011, 3 pgs.
Pantech, "PUCCH Resource Allocation With SORTD for Channel Selection", 3GPP TSG RAN1 #63, Jacksonville, USA, Nov. 15-19, 2010, 5 pgs.
Foreign Communication From a Related Counterpart Application, Japanese Application No. 2015-506895, Notification, of Reason of Rejection dated Jan. 30, 2017, 8 pages.
Office Action dated Jun. 18, 2018 in connection with European Patent Application No. 13 777 659.7.
European Patent Office, "Communication pursuant to Article 94(3) EPC," Application No. EP13777659.7, dated Aug. 19, 2019, 7 pages.
3GPP TS 36.213 V10.1.0 (Mar. 2011), Technical Specification, 3rd Generation Partnership Project; Technical Specification Group Radio Access Network; Evolved Universal Terrestrial Radio Access (E-UTRA); Physical layer procedures (Release 10), 115 pages.

* cited by examiner

METHOD AND APPARATUS FOR ALLOCATING HARQ-ACK CHANNEL RESOURCES SUPPORTING TRANSMIT DIVERSITY AND CHANNEL SELECTION

CROSS-REFERENCE TO RELATED APPLICATIONS

This application is a continuation of U.S. patent application Ser. No. 16/357,065 filed on Mar. 18, 2019, which is a continuation of U.S. patent application Ser. No. 15/714,978 filed on Sep. 25, 2017 now U.S. Pat. No. 10,237,024 issued on Mar. 19, 2019, which is a continuation of U.S. patent application Ser. No. 14/395,805 filed on Oct. 20, 2014 now U.S. Pat. No. 9,774,422 issued on Sep. 26, 2017, which is a 371 of International Application No. PCT/KR2013/003235 filed on Apr. 17, 2013, which claims priority to Chinese Patent Application No. 201210119285.1 filed on Apr. 20, 2012, the disclosures of which are herein incorporated by reference in their entirety.

BACKGROUND

1. Field

The present invention relates to radio communications techniques, and more particularly, to a method and apparatus for allocating HARQ-ACK channel resources supporting transmit diversity and channel selection.

2. Description of Related Art

At present, the maximum transmission bandwidth of Long-Term Evolution (LTE) systems is 20 MHz. It cannot meet the requirement of high data rate. Currently, in order to increase user's transmission rate, LTE-Advanced is proposed based on LTE. In LTE-A systems, multiple Component Carriers (CCs) are aggregated to obtain a wider bandwidth and form uplink and downlink of the communication system, so as to support higher transmission rate. This technique is called Carrier Aggregation (CA). For example, in order to support 100 MHz bandwidth, five 20 MHz CCs may be aggregated. Herein, each CC is referred to as a cell.

Among multiple downlink CCs configured by a base station, one is a primary cell (Pcell) and others are secondary cells (Scell). The base station configures a UE to receive downlink data of multiple cells through higher layer signaling. The number of cells scheduled in one subframe may be smaller than or equal to the number of cells configured by higher layers. For example, in FIG. 1, four cells are configured, respectively are cell 1 to cell 4. The base station schedules only one cell, i.e., cell 1. For another example, in FIG. 2, four cells are configured, respectively are cell 1 to cell 4. The base station schedules three cells, i.e., cell 1, cell 2 and cell 3. Herein, data transmission of one downlink cell may be scheduled by Physical Downlink Control Channel (PDCCH) transmitted in other cells. This method is referred to as cross-carrier scheduling. Or, the data transmission of one downlink cell may be scheduled by the PDCCH of this cell. This method is referred to as non cross-carrier scheduling.

Based on the CA technique, the base station transmits downlink data to the same UE on multiple cells. Accordingly, the UE needs to feedback HARQ-ACK information of the downlink data transmitted on multiple cells. According to a discuss result of LTE-A, the HARQ-ACK feedback information of the data transmission on the cells is transmitted on one uplink cell (i.e., uplink Pcell). In order to support the transmission of multiple HARQ-ACK feedback bits, a method based on channel selection may be adopted in LTE-A to support at most 4 HARQ-ACK feedback bits. This method has been used in LTE TDD systems. In the case of channel selection of non-transmit-diversity, the number of HARQ-ACK resources to be allocated is equal to that of HARQ-ACK feedback bits.

According to the discuss result of LTE-A, in LTE-A FDD systems, the channel selection method supports at most 2 cells in fact, and each cell may feed back one or two HARQ-ACK feedback bits. Herein, in the case that Spatial Orthogonal Resource Transmit Diversity (SORTD) is not adopted to support transmit diversity, the method for allocating the HARQ-ACK channel resources is as follows.

For a downlink Pcell, the HARQ-ACK channel used by the HARQ-ACK feedback information of the Pcell is determined according to a Control Channel Element (CCE) index of the PDCCH via an implicit method.

For a downlink Scell, if cross-carrier scheduling is not adopted, the HARQ-ACK channel used by the HARQ-ACK feedback information of the Scell is determined according to a HARQ-ACK Resource Indicator (ARI) in the PDCCH scheduling the Scell; if the Scell is cross-carrier scheduled from the PDCCH of the Pcell, the HARQ-ACK channel used by the HARQ-ACK information of the Scell is determined via a implicit method according to the CCE index of the PDCCH.

If the Cell is configured with a Single Input Multiple Output (SIMO) transmission mode, since it is only required to feedback one HARQ-ACK with respect to one Transmission Block (TB) of the Cell, one HARQ-ACK channel needs to be allocated. Accordingly, if the Cell is configured with a Multiple Input Multiple Output (MIMO) transmission mode, two HARQ-ACK need to be feedbacked with respect to two TBs of the Cell. Therefore, two HARQ-ACK channels need to be allocated.

SUMMARY

As to the situation of allocating HARQ-ACK channel via the implicit method, the HARQ-ACK channel used by the HARQ-ACK information of one Cell is obtained through the PDCCH scheduling the data transmission of the Cell. In particular, the index of a first CCE of the PDCCH is denoted as $n_{CCE}$. If one HARQ-ACK channel needs to be allocated, the HARQ-ACK channel may be mapped according to the index $n_{CCE}$ of the first CCE. If two HARQ-ACK channels need to be allocated, the two HARQ-ACK channels may be mapped according to the first CCE index $n_{CCE}$ and the second CCE index $n_{CCE}+1$.

In addition, according to a current discussed result, in the case that the UE is configured with only one cell, the SORTD method is adopted to support transmit diversity. That is to say, two HARQ-ACK channels are allocated to the UE, two transmission antennas respectively use different channels to transmit the same HARQ-ACK feedback information repeatedly. A receiver receives signals from the two channels and performs a Maximum Ratio Combination (MRC) to obtain an optimal diversity effect. Herein, the lowest CCE index of PDCCH is denoted by n. the two HARQ-ACK channels are obtained via the implicit method based on the CCE indexes n and n+1. Corresponding to method for transmitting HARQ-ACK feedback information of the two CCs based on channel selection, in the case that transmit diversity needs to be supported, the SORTD technique may also be adopted. At this time, in order to feedback M HARQ-ACK bits, the number of required HARQ-ACK channels is 2M, wherein M=2, 3 or 4. However, there is no relevant solution at present as how to allocate the 2M HARQ-ACK channel resources, wherein the HARQ-ACK channels resources refer to PUCCH channel resources used for transmitting HARQ-ACK feedback information.

Examples of the present invention provide a method for allocating HARQ-ACK channel resources supporting transmit diversity and channel selection, so as to allocate HARQ-ACK channel resources for a UE in the premise that channel selection and SORTD technique are supported.

According to an example of the present invention, a method for allocating Hybrid Automatic Repeat Request Acknowledgement (HARQ-ACK) channel resources supporting transmit diversity and channel selection is provided. The method includes:
  receiving, by a UE, Physical Downlink Control Channel (PDCCH) information and Physical Downlink Shared Channel (PDSCH) data from a base station through two Component Carriers (CCs);
  obtaining, by the UE according to specific indication information, Physical Uplink Control Channel (PUCCH) channel resources required for transmitting HARQ-ACK feedback information using a transmit diversity technique; and
  transmitting, by the UE, the HARQ-ACK feedback information on the obtained PUCCH channel resources adopting the transmit diversity technique.

Preferably, the UE obtains at most 4 PUCCH 1a/1b channel resources of each CC according to the specific indication information, and transmits the HARQ-ACK feedback information adopting a Spatial Orthogonal Resource Transmit Diversity (SORTD) technique using PUCCH format 1b with channel selection.

Preferably, the UE is configured with a Frequency Division Duplexing (FDD).

Preferably, if the CC is a primary CC and is configured with a Single Input Multiple Output (SIMO) transmission mode, the CC requires 2 PUCCH 1a/1b channel resources to transmit the HARQ-ACK feedback information, denoted by CH_1 and CH_2;
  the specific indication information is the lowest Control Channel Element (CCE) index n of the PDCCH scheduling the PDSCH of the primary cell; and
  CH_1 and CH_2 are obtained by mapping according to CCE indexes n and n+1.

Preferably, if the CC is a Pcell and is configured with a Multiple Input Multiple Output (MIMO) transmission mode, the CC requires 4 PUCCH 1a/1b channel resources to transmit the HARQ-ACK feedback information, denoted by CH_1, CH_2, CH_3 and CH_4;
  CH_1 and CH_2 are obtained by mapping according to CCE indexes n and n+1 of the PDCCH scheduling the PDSCH of the Pcell, wherein n is the lowest CCE index of the PDCCH;
  CH_3 and CH_4 are obtained through any one of:
  mapping according to CCE indexes n+2 and n+3 of the PDCCH scheduling the PDSCH of the Pcell, wherein n is the lowest CCE index of the PDCCH;
  configuring 2 PUCCH 1a/1b channel resources semi-statically by higher layer signaling;
  configuring multiple PUCCH 1a/1b channel resource semi-statically by higher layer signaling, obtaining 2 PUCCH channel resources through mapping multiple HARQ-ACK channels according to HARQ-ACK Resource indicator (ARI) in the PDCCH scheduling data transmission of the Pcell; and
  configuring multiple PUCCH 1a/1b channel resource semi-statically by higher layer signaling, obtaining 2 PUCCH channel resources through mapping multiple HARQ-ACK channels according to the ARI in the PDCCH scheduling data transmission of the Scell.

Preferably, if the CC is a Scell and is configured with a SIMO transmission mode, the CC requires 2 PUCCH 1a/1b channel resources to transmit the HARQ-ACK feedback information, denoted by CH_1 and CH_2;
  if the Scell is cross-carrier scheduled by the Pcell, the specific indication information is the lowest CCE index n of the PDCCH scheduling the PDSCH of the Scell, and CH_1 and CH_2 are obtained through mapping according to CCE indexes n and n+1.

Preferably, if the CC is a Scell and is configured with a MIMO transmission mode, the CC requires 4 PUCCH 1a/1b channel resources to transmit the HARQ-ACK feedback information, denoted by CH_1, CH_2, CH_3 and CH_4; if the Scell is cross-carrier scheduled by the Pcell,
  CH_1 and CH_2 are obtained through mapping according to CCE indexes n and n+1 of the PDCCH scheduling the PDSCH of the Scell, wherein n is the lowest CCE index of the PDCCH;
  CH_3 and CH_4 are obtained through any one of:
  mapping according to CCE indexes n+2 and n+3 of the PDCCH scheduling the PDSCH of the Scell, wherein n is the lowest CCE index of the PDCCH;
  configuring 2 PUCCH 1a/1b channel resources semi-statically by higher layer signaling; and
  configuring multiple PUCCH 1a/1b channel resources semi-statically by higher layer signaling, and obtaining 2 PUCCH 1a/1b channel resources through mapping multiple HARQ-ACK channels according to ARI in the PDCCH scheduling the PDSCH of the Scell.

Preferably, if the CC is a Scell and is configured with a MIMO transmission mode, the CC requires 4 PUCCH 1a/1b channel resources to transmit the HARQ-ACK feedback information, denoted by CH_1, CH_2, CH_3 and CH_4;
  if the Scell is cross-carrier scheduled by the Pcell, CH_1, CH_2, CH_3 and CH_4 are obtained by: configuring multiple PUCCH 1a/1b channel resources semi-statically by higher layer signaling, and obtaining 4 PUCCH 1a/1b channel resources through mapping multiple HARQ-ACK channels according to ARI in the PDCCH scheduling the PDSCH of the Scell.

Preferably, if the CC is a Scell and is configured with a SIMO transmission mode, the CC requires 2 PUCCH 1a/1b channel resources to transmit the HARQ-ACK feedback information, denoted by CH_1 and CH_2;
  if the Scell is scheduled by itself, CH_1 and CH_2 are obtained by: configuring multiple PUCCH 1a/1b channel resource semi-statically by higher layer signaling, and obtaining 2 PUCCH 1a/1b channel resources through mapping multiple HARQ-ACK channels according to ARI in the PDCCH scheduling the PDSCH of the Scell.

Preferably, if the CC is a Scell and is configured with a MIMO transmission mode, the CC requires 4 PUCCH 1a/1b channel resources to transmit the HARQ-ACK feedback information, denoted by CH_1, CH_2, CH_3 and CH_4;
  if the Scell is scheduled by itself, CH_1, CH_2, CH_3 and CH_4 are obtained by: configuring multiple PUCCH 1a/1b channel resources semi-statically by higher layer signaling, and obtaining 4 PUCCH 1a/1b channel resources through mapping multiple HARQ-ACK channels according to ARI in the PDCCH scheduling the PDSCH of the Scell.

Preferably, the UE is configured with a Time Division Duplexing (TDD), and the number of elements in a Downlink Association Set (DAS) of the CC is 1.

Preferably, if the CC is a Pcell and is configured with a SIMO transmission mode, the CC requires 2 PUCCH 1a/1b channel resources to transmit the HARQ-ACK feedback information, denoted by CH_1 and CH_2;
- the specific indication information is the lowest CCE index n of the PDCCH scheduling the PDSCH of the Pcell;
- CH_1 and CH_2 are obtained by mapping according to CCE indexes n and n+1.

Preferably, if the CC is a Pcell and is configured with a MIMO transmission mode, the CC requires 4 PUCCH 1a/1b channel resources to transmit the HARQ-ACK feedback information, denoted by CH_1, CH_2, CH_3 and CH_4;
- CH_1 and CH_2 are obtained by mapping according to CCE indexes n and n+1 of the PDCCH scheduling the PDSCH of the Pcell, wherein n is the lowest CCE index of the PDCCH;
- CH_3 and CH_4 are obtained through any one of:
- mapping according to CCE indexes n+2 and n+3 of the PDCCH scheduling the PDSCH of the Pcell, wherein n is the lowest CCE index of the PDCCH;
- configuring 2 PUCCH 1a/1b channel resources semi-statically by higher layer signaling;
- configuring multiple PUCCH 1a/1b channel resources semi-statically by higher layer signaling, and obtaining 2 PUCCH 1a/1b channel resources through mapping multiple HARQ-ACK channels according to ARI in the PDCCH scheduling data transmission of the Pcell; and
- configuring multiple PUCCH 1a/1b channel resources semi-statically by higher layer signaling, and obtaining 2 PUCCH 1a/1b channel resources through mapping multiple HARQ-ACK channels according to ARI in the PDCCH scheduling data transmission of the Scell.

Preferably, if the UE is configured with the TDD and the number of elements in the DAS of the CC is 1, values in a Downlink Allocation Index (DAI) field is taken as the ARI, and the PUCCH 1a/1b channel resources of CH_3 and CH_4 are obtained through mapping according to table 1.

TABLE 1

| DAI values | {CH_3, CH_4} channel resources obtained by mapping |
|---|---|
| 0, 0 | The first set including two PUCCH resources configured by higher layers |
| 0, 1 | The second set including two PUCCH resources configured by higher layers |
| 1, 0 | The third set including two PUCCH resources configured by higher layers |
| 1, 1 | The fourth set including two PUCCH resources configured by higher layers |

Preferably, if the CC is a Scell and is configured with a SIMO transmission mode, the CC requires 2 PUCCH 1a/1b channel resources to transmit the HARQ-ACK feedback information, denoted by CH_1 and CH_2;
- if the Scell is cross-carrier scheduled by the Pcell, the specific indication information is the lowest CCE index n of the PDCCH scheduling the PDSCH of the Scell, CH_1 and CH_2 are obtained through mapping according to the CCE indexes n and n+1.

Preferably, if the CC is a Scell and is configured with a MIMO transmission mode, the CC requires 4 PUCCH 1a/1b channel resources to transmit the HARQ-ACK feedback information, denoted by CH_1, CH_2, CH_3 and CH_4; if the Scell is cross-carrier scheduled by the Pcell,
- CH_1 and CH_2 are obtained by mapping according to CCE indexes n and n+1 of the PDCCH scheduling the PDSCH of the Scell, wherein n is the lowest CCE index of the PDCCH;
- CH_3 and CH_4 are obtained through any one of:
- mapping according to CCE indexes n+2 and n+3 of the PDCCH scheduling the PDSCH of the Scell, wherein n is the lowest CCE index of the PDCCH;
- configuring 2 PUCCH 1a/1b channel resources semi-statically by higher layer signaling;
- configuring multiple PUCCH 1a/1b channel resources semi-statically by higher layer signaling, and obtaining 2 PUCCH 1a/1b channel resources through mapping multiple HARQ-ACK channels according to ARI in the PDCCH scheduling the PDSCH of the Scell.

Preferably, if the CC is a Scell and is configured with a MIMO transmission mode, the CC requires 4 PUCCH 1a/1b channel resources to transmit the HARQ-ACK feedback information, denoted by CH_1, CH_2, CH_3 and CH_4;
- if the Scell is cross-carrier scheduled by the Pcell, CH_1, CH_2, CH_3 and CH_4 are obtained through: configuring multiple PUCCH 1a/1b channel resources semi-statically by higher layer signaling, and obtaining 4 PUCCH 1a/1b channel resources through mapping multiple HARQ-ACK channels according to ARI in the PDCCH scheduling the PDSCH of the Scell.

Preferably, if the CC is a Scell and is configured with a SIMO transmission mode, the CC requires 2 PUCCH 1a/1b channel resources to transmit the HARQ-ACK feedback information, denoted by CH_1 and CH_2;
- if the Scell is scheduled by itself, CH_1 and CH_2 are obtained through: configuring multiple PUCCH 1a/1b channel resources semi-statically by higher layer signaling, and obtaining 2 PUCCH 1a/1b channel resources through mapping multiple HARQ-ACK channels according to ARI in the PDCCH scheduling the PDSCH of the Scell.

Preferably, if the CC is a Scell and is configured with a MIMO transmission mode, the CC requires 4 PUCCH 1a/1b channel resources to transmit the HARQ-ACK feedback information, denoted by CH_1, CH_2, CH_3 and CH_4;
- if the Scell is scheduled by itself, CH_1, CH_2, CH_3 and CH_4 are obtained through: configuring multiple PUCCH 1a/1b channel resources semi-statically by higher layer signaling, and obtaining 4 PUCCH 1a/1b channel resources through mapping multiple HARQ-ACK channels according to ARI in the PDCCH scheduling the PDSCH of the Scell.

Preferably, the UE is configured with a TDD and the number of elements in a DAS of the CC is 2.

Preferably, if the CC is a Pcell and is configured with a MIMO transmission mode, the CC requires 4 PUCCH 1a/1b channel resources to transmit the HARQ-ACK feedback information, denoted by CH_1, CH_2, CH_3 and CH_4; subframes 0 and 1 respectively provide 2 PUCCH 1a/1b channel resources; if no Semi-Persistent Scheduling (SPS) service is configured in the subframes, HARQ-ACK resource of CH_1 is determined according to the lowest CCE index n of the PDCCH of subframe 0 scheduling the PDSCH, HARQ-ACK resource of CH_2 is determined according to CCE index n+1 of the PDCCH of subframe 0 scheduling the PDSCH, HARQ-ACK resource of CH_3 is determined according to the lowest CCE index m of the PDCCH of subframe 1 scheduling the PDSCH, and HARQ-ACK resource of CH_4 is determined according to CCE index m+1 of the PDCCH of subframe 1 scheduling the PDSCH; if the SPS service is configured in the subframe, 2 PUCCH 1a/1b channel resources required by the subframe are 2 HARQ-ACK resources semi-statically configured by higher layer signaling.

Preferably, if the CC is a Scell, the CC requires 4 PUCCH 1a/1b channel resources to transmit the HARQ-ACK feedback information, denoted by CH_1, CH_2, CH_3 and CH_4; subframes 0 and 1 respectively provide 2 PUCCH 1a/1b channel resources; if the PDSCH of the Scell is cross-carrier scheduled by the PDCCH of the Pcell, HARQ-ACK resource of CH_1 is determined according to the lowest CCE index n of the PDCCH of subframe 0 scheduling the PDSCH, HARQ-ACK resource of CH_2 is determined according to CCE index n+1 of the PDCCH of subframe 0 scheduling the PDSCH, HARQ-ACK resource of CH_3 is determined according to the lowest CCE index m of the PDCCH of subframe 1 scheduling the PDSCH, and HARQ-ACK resource of CH_4 is determined according to CCE index m+1 of the PDCCH of subframe 1 scheduling the PDSCH, wherein the lowest CCE index is n.

Preferably, if the CC is a Scell, the CC requires 4 PUCCH 1a/1b channel resources to transmit the HARQ-ACK feedback information, denoted by CH_1, CH_2, CH_3 and CH_4; if the Scell is scheduled by itself, the method for obtaining the CH_1, CH_2, CH_3 and CH_4 comprises: configuring multiple PUCCH 1a/1b channel resources semi-statically by higher layer signaling, and obtaining 4 PUCCH 1a/1b channel resources by mapping the multiple HARQ-ACK channels according to ARI in the PDCCH scheduling the PDSCH of the Scell Preferably, the UE is configured with a TDD working manner and the number of elements in a DAS of the CC is larger than 2.

Preferably, if the CC is a Pcell, the CC requires 4 PUCCH 1a/1b channel resources to transmit the HARQ-ACK feedback information, denoted by CH_1, CH_2, CH_3 and CH_4; if no SPS service is configured in the cell, HARQ-ACK resource of CH_1 is determined according to the lowest CCE index n of the PDCCH of a subframe with DAI=1 scheduling the PDSCH, HARQ-ACK resource of CH_2 is determined according to CCE index n+1 of the PDCCH of the subframe with DAI=1 scheduling the PDSCH, HARQ-ACK resource of CH_3 is determined according to the lowest CCE index m of the PDCCH of a subframe with DAI=2 scheduling the PDSCH, and HARQ-ACK resource of CH_4 is determined according to CCE index m+1 of the PDCCH of the subframe with DAI=2 scheduling the PDSCH; if the SPS service is configured in the subframe, 2 HARQ-ACK resources are configured by higher layers for the SPS service semi-statically, wherein CH_1 is the first HARQ-ACK resource configured semi-statically by the higher layers for the SPS service, CH_2 is the second HARQ-ACK resource configured semi-statically by the higher layers for the SPS service; HARQ-ACK resource of CH_3 is determined according to the lowest CCE index n of the PDCCH of the subframe with DAI=1 scheduling the PDSCH, and HARQ-ACK resource of CH_4 is determined according to the CCE index n+1 of the PDCCH of the subframe with DAI=1 scheduling the PDSCH.

Preferably, if the CC is a Scell, the CC requires 4 PUCCH 1a/1b channel resources to transmit the HARQ-ACK feedback information, denoted by CH_1, CH_2, CH_3 and CH_4; if the PDSCH of the Scell is cross-carrier scheduled by the PDCCH of the Pcell, HARQ-ACK resource of CH 1 is determined according to the lowest CCE index n of the PDCCH of a subframe with DAI=1 scheduling the PDSCH, HARQ-ACK resource of CH_2 is determined according to CCE index n+1 of the PDCCH of the subframe with DAI=1 scheduling the PDSCH, HARQ-ACK resource of CH_3 is determined according to the lowest CCE index m of the PDCCH of a subframe with DAI=2 scheduling the PDSCH, and HARQ-ACK resource of CH_4 is determined according to CCE index m+1 of the PDCCH of the subframe with DAI=2 scheduling the PDSCH.

Preferably, if the CC is a Scell, the CC requires 4 PUCCH 1a/1b channel resources to transmit the HARQ-ACK feedback information, denoted by CH_1, CH_2, CH_3 and CH_4; if the Scell is scheduled by itself, the method for obtaining the CH_1, CH_2, CH_3 and CH_4 is as follows: configuring multiple PUCCH 1a/1b channel resources semi-statically by higher layer signaling, and obtaining 4 PUCCH 1a/1b channel resources by mapping the multiple HARQ-ACK channels according to ARI in the PDCCH scheduling the PDSCH of the Scell.

It can be seen from the above technical solution that, according to the method for allocating HARQ-ACK channel resources provided by the examples of the present invention, it is possible to allocate HARQ-ACK channel resources to the UE reasonably and avoid waste of channel resources in the premise that channel selection and SORTD technique are supported.

DETAILED DESCRIPTION

The present invention will be described in further detail hereinafter with reference to accompanying drawings and embodiments to make the objective, technical solution and merits therein clearer.

In order to solve the above technical problem, an example of the present invention provides a method for allocating HARQ-ACK channel resources when HARQ-ACK feedback information is transmitted based on channel selection and SORTD technique is used to support transmit diversity. Through the method, it is ensured that resources occupied by SORTD technique are as less as possible.

Two transmission antennas will be mentioned in the following description. Herein, each antenna may be a physical transmission antenna or composed by signals of multiple physical antennas. For example, for a UE configured with four physical antennas, in order to support two-antenna transmit diversity, each antenna may consist of two physical antennas. In the case that SORTD is not adopted, if the number of HARQ-ACK feedback bits is M, M HARQ-ACK channels need to be allocated. Accordingly, in the case that SORTD is adopted, 2M HARQ-ACK channels needs to be allocated and divided into two groups, wherein each group includes M channels. Thus, each antenna selects one channel for use from the M HARQ-ACK channels of one group. In order to simplify the designation, suppose that the two antennas adopt same channel selection mapping table which is the same as that when SORTD is not adopted.

Figure 1:
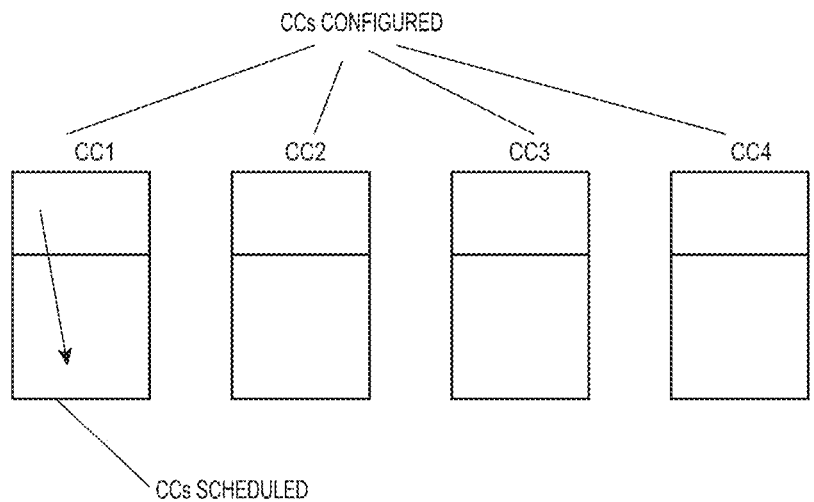
FIG. 1 is a schematic diagram illustrating scheduling of one cell by the base station according to the prior art.
Figure 2:
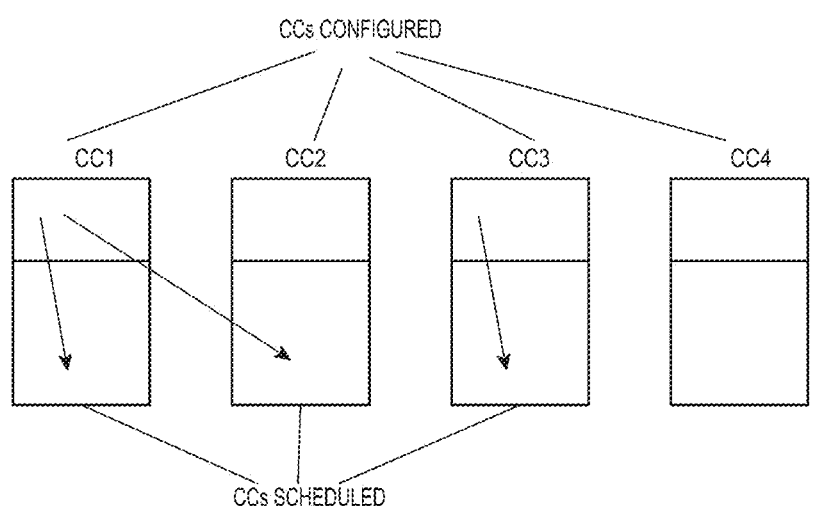
FIG. 2 is a schematic diagram illustrating scheduling of three cells by the base station according to the prior art.
Figure 3:
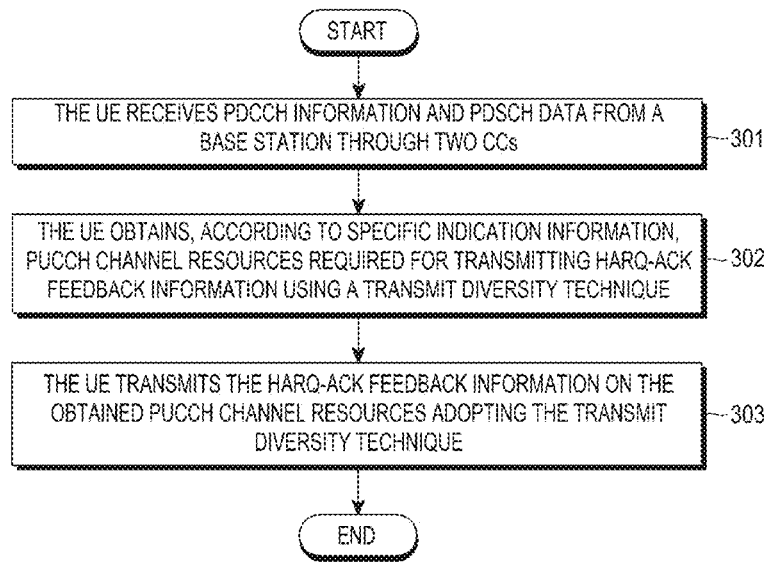
FIG. 3 is a flowchart illustrating a method for allocating HARQ-ACK channel resources supporting transmit diversity and channel selection according to an example of the present invention.

The method for allocating HARQ-ACK channel resources supporting transmit diversity and channel selection is as shown in FIG. 3. The method includes the following.

At step 301, the UE receives Physical Downlink Control Channel (PDCCH) information and Physical Downlink Shared Channel (PDSCH) data transmitted by the base station via two CCs.

At step 302, the UE obtains PUCCH channel resources used for transmitting HARQ-ACK feedback information based on transmit diversity technique (e.g., SORTD technique) according to specific indication information.

At step 303, the UE transmits the HARQ-ACK feedback information to the base station based on the transmit diversity technique on the PUCCH channel resources obtained.

Now, the flow shown in FIG. 3 ends.

For step 302, there are the following cases.

Case 1:

If the UE is configured with a FDD, the UE obtains at most 4 PUCCH 1a/1b channel resources of each CC according to the specific indication information. The HARQ-ACK feedback information is transmitted using PUCCH format 1b with channel selection based on the SORTD technique.

Case 1-1:

If the CC is a Pcell and is configured with a Single Input Multiple Output (SIMO) transmission mode, the CC requires 2 PUCCH 1a/1b channel resources to transmit the HARQ-ACK feedback information, denoted by CH_1, CH_2. At this time, the specific indication information refers to the lowest CCE index n of the PDCCH scheduling the PDSCH of the CC. CH_1 and CH_2 may be obtained through mapping according to CCE indexes n and n+1.

Case 1-2:

If the CC is a Pcell and is configured with MIMO transmission mode, the CC requires 4 PUCCH 1a/1b channel resources to transmit the HARQ-ACK feedback information, denoted by CH_1, CH_2, CH_3 and CH_4, wherein CH_1 and CH_2 may be obtained through mapping according to the CCE indexes n and n+1 of the PDCCH scheduling the PDSCH of the CC, n is the lowest CCE index of the PDCCH; CH_3 and CH_4 may be obtained according to any one of the following 4 methods.

Method 1: CH_3 and CH_4 are obtained through mapping according to CCE indexes n+2 and n+3 of the PDCCH scheduling the PDSCH of the CC, wherein n is the lowest CCE index of the PDCCH.

Method 2: configuring two PUCCH 1a/1b channel resources semi-statically by higher layer signaling.

Method 3: configuring multiple PUCCH 1a/1b channel resources semi-statically by higher layer signaling, and obtaining 2 PUCCH 1a/1b channel resources by mapping the multiple HARQ-ACK channels according to HARQ-ACK Resource indicator (ARI) of the PDCCH scheduling data transmission of the Pcell.

Method 4: configuring multiple PUCCH 1a/1b channel resources semi-statically by higher layer signaling, and obtaining 2 PUCCH 1a/1b channel resources by mapping the multiple HARQ-ACK channels according to the ARI of the PDCCH scheduling the Scell.

Case 1-3:

If the CC is a Scell and is configured with the SIMO transmission mode, the CC requires 2 PUCCH 1a/1b channel resources to transmit the HARQ-ACK feedback information, denoted by CH_1, CH_2. If the Scell is cross-carrier scheduled by the Pcell, CH_1 and CH_2 are obtained by mapping according to CCE indexes n and n+1 of the PDCCH scheduling the PDSCH, wherein n is the lowest CCE index of the PDCCH.

Case 1-4:

If the CC is a Scell and is configured with the MIMO transmission mode, the CC requires 4 PUCCH 1a/1b channel resources to transmit the HARQ-ACK feedback information, denoted by CH_1, CH_2, CH_3 and CH_4.

If the Scell is cross-carrier scheduled by the Pcell, CH_1 and CH_2 are obtained by mapping according to CCE indexes n and n+1 of the PDCCH scheduling the PDSCH, wherein n is the lowest CCE index of the PDCCH. CH_3 and CH_4 are obtained according to any one of the following three methods.

Method 1: CH_3 and CH_4 are obtained by mapping according to CCE indexes n+2 and n+3 of the PDCCH scheduling the PDSCH of the CC, wherein n is the lowest CCE index of the PDCCH.

Method 2: configuring two PUCCH 1a/1b channel resources semi-statically by higher layer signaling.

Method 3: configuring multiple PUCCH 1a/1b channel resources semi-statically by higher layer signaling, and obtaining 2 PUCCH 1a/1b channel resources by mapping the multiple HARQ-ACK channels according to the ARI of the PDCCH scheduling the PDSCH of the Scell.

If the Scell is cross-carrier scheduled by the Pcell, another method for obtaining CH_1, CH_2, CH_3 and CH_4 is as follows: configuring multiple PUCCH 1a/1b channel resources semi-statically by higher layer signaling, obtaining 4 PUCCH 1a/1b channel resources by mapping the multiple HARQ-ACK channels according to the ARI of the PDCCH scheduling the PDSCH of the Scell.

Case 1-5:

If the CC is a Scell and is configured with the SIMO transmission mode, the CC requires 2 PUCCH 1a/1b channel resource to transmit the HARQ-ACK feedback information, denoted by CH_1 and CH_2. If the Scell is scheduled by itself, CH_1 and CH_2 are obtained as follows: configuring multiple PUCCH 1a/1b channel resources semi-statically by higher layer signaling, and obtaining 2 PUCCH 1a/1b channel resources by mapping the multiple HARQ-ACK channels according to the ARI of the PDCCH scheduling the PDSCH of the Scell.

Case 1-6:

If the CC is a Scell and is configured with the MIMO transmission mode, the CC requires 4 PUCCH 1a/1b channel resources to transmit the HARQ-ACK feedback information, denoted by CH_1, CH_2, CH_3 and CH_4. If the Scell is scheduled by itself, the method for obtaining CH_1, CH_2, CH_3 and CH_4 is as follows: configuring multiple PUCCH 1a/1b channel resources semi-statically by higher layer signaling, and obtaining 4 PUCCH 1a/1b channel resources by mapping the multiple HARQ-ACK channels according to the ARI of the PDCCH scheduling the PDSCH of the Scell.

Case 2:

If the UE is configured with a TDD working manner and the number of elements in Downlink Association Set (DAS) of the CC is 1, the UE obtains at most 4 PUCCH 1a/1b channel resources of each CC according to the specific indication information.

Case 2-1:

If the CC is a Pcell and is configured with the SIMO transmission mode, the CC requires 2 PUCCH 1a/1b channel resources to transmit the HARQ-ACK feedback information, denoted by CH_1 and CH_2. CH_1 and CH_2 may be obtained by mapping according to CCE indexes n and n+1 of the PDCCH scheduling the PDSCH, wherein n is the lowest CCE index of the PDCCH.

Case 2-2:

If the CC is a Pcell and is configured with the MIMO transmission mode, the CC requires 4 PUCCH 1a/1b channel resources to transmit the HARQ-ACK feedback information, denoted by CH_1, CH_2, CH_3 and CH_4. CH_1 and CH_2 are obtained by mapping according to CCE indexes n and n+1 of the PDCCH scheduling the PDSCH, wherein n is the lowest CCE index of the PDCCH. CH_3 and CH_4 may be obtained through any one of the following three methods.

Method 1: CH_3 and CH_4 are obtained by mapping according to CCE indexes n+2 and n+3 of the PDCCH scheduling the PDSCH of the CC, wherein n is the lowest CCE index of the PDCCH.

Method 2: configuring two PUCCH 1a/1b channel resources semi-statically by higher layer signaling.

Method 3: configuring multiple PUCCH 1a/1b channel resources semi-statically by higher layer signaling, and obtaining through 2 PUCCH 1a/1b channel resources by mapping the multiple HARQ-ACK channels according to the ARI of the PDCCH scheduling data transmission of the Pcell. In particular, in LTE Rel-10, when the PDCCH of the Pcell schedules the PDSCH of the Pcell, Transmission Power Control (TPC) in the PDCCH is used for power control command and cannot be used as ARI. Thus, a new field is required to serve as the ARI. If the CA system is configured with the TDD transmission and the number of elements in the DAS of the CC is equal to 1, the Downlink Assignment Index (DAI) of the PDCCH exists but is not used. In the present invention, the DAI field is used as the ARI. Thus, the PUCCH 1a/1b channel resources of CH_3 and CH_4 may be obtained through mapping. The detailed method is shown in table 2.

TABLE 2

| DAI values | {CH_3, CH_4} channel resources obtained by mapping |
|---|---|
| 0, 0 | The first set including two PUCCH resources configured by higher layers |
| 0, 1 | The second set including two PUCCH resources configured by higher layers |
| 1, 0 | The third set including two PUCCH resources configured by higher layers |
| 1, 1 | The fourth set including two PUCCH resources configured by higher layers |

According to table 2, if the value of the DAI field is "0, 0", the UE is indicated to use the first set which is configured by higher layers and includes two PUCCH resources as CH_3 and CH_4. If the value of the DAI field is "0, 1", the UE is indicated to use the second set which is configured by higher layers and includes two PUCCH resources as CH_3 and CH_4. If the value of the DAI field is "1, 0", the UE is indicated to use the third set which is configured by higher layers and includes two PUCCH resources as CH_3 and CH_4. If the value of the DAI field is "1, 1", the UE is indicated to use the fourth set which is configured by higher layers and includes two PUCCH resources as CH_3 and CH_4.

Method 4: another method for obtaining the CH_3 and CH_4 is as follows: configuring multiple PUCCH 1a/1b channel resources semi-statically by higher layer signaling, and obtaining 2 PUCCH 1a/1b channel resources through mapping the multiple HARQ-ACK channels according to the ARI in the PDCCH scheduling the Scell.

Case 2-3:

If the CC is a Scell and is configured with the SIMO transmission mode, the CC requires 2 PUCCH 1a/1b channel resources to transmit the HARQ-ACK feedback information, denoted by CH_1 and CH_2. If the Scell is cross-carrier scheduled by the Pcell, CH_1 and CH_2 are obtained by mapping according to CCE indexes n and n+1 of the PDCCH scheduling the PDSCH, wherein n is the lowest CCE index of the PDCCH.

Case 2-4:

If the CC is a Scell and is configured with the MIMO transmission mode, the CC requires 4 PUCCH 1a/1b channel resources to transmit the HARQ-ACK feedback information, denoted by CH_1, CH_2, CH_3 and CH_4.

If the Scell is cross-carrier scheduled by the Pcell, CH_1 and CH_2 may be obtained by mapping according to the CCE indexes n and n+1 of the PDCCH scheduling the PDSCH, wherein n is the lowest CCE index of the PDCCH; CH_3 and CH_4 may be obtained through any one of the following three methods.

Method 1: CH_3 and CH_4 are mapped according to CCE indexes n+2 and n+3 of the PDCCH scheduling the PDSCH of the CC, wherein n is the lowest CCE index of the PDCCH.

Method 2: configuring two PUCCH 1a/1b channel resources semi-statically by higher layer signaling.

Method 3: configuring multiple PUCCH 1a/1b channel resources are semi-statically by higher layer signaling, and obtaining 2 PUCCH 1a/1b channel resources by mapping the multiple HARQ-ACK channels according to the ARI of the PDCCH scheduling the PDSCH of the Scell.

If the Scell is cross-carrier scheduled by the Pcell, another method for obtaining CH_1, CH_2, CH_3 and CH_4 is as follows: configuring multiple PUCCH 1a/1b channel resources semi-statically by higher layer signaling, and obtaining 4 PUCCH 1a/1b channel resources by mapping the multiple HARQ-ACK channels according to the ARI of the PDCCH scheduling the PDSCH of the Scell.

Case 2-5:

If the CC is a Scell and is configured with the SIMO transmission mode, the CC requires 2 PUCCH 1a/1b channel resources to transmit the HARQ-ACK feedback information, denoted by CH_1 and CH_2. If the Scell is scheduled by itself, CH_1 and CH_2 are obtained through the following method: configuring multiple PUCCH 1a/1b channel resources semi-statically by higher layer signaling, and obtaining 2 PUCCH 1a/1b channel resources through mapping the multiple HARQ-ACK channels according to the ARI in the PDCCH scheduling the PDSCH of the Scell.

Case 2-6:

If the CC is a Scell and is configured with the MIMO transmission mode, the CC requires 4 PUCCH 1a/1b channel resources to transmit the HARQ-ACK feedback information, denoted by CH_1, CH_2, CH_3 and CH_4. If the Scell is scheduled by itself, CH_1, CH_2, CH_3 and CH_4 are obtained through the following method: configuring multiple PUCCH 1a/1b channel resources semi-statically by higher layer signaling, and obtaining 4 PUCCH 1a/1b channel resources through mapping the multiple HARQ-ACK channels according to the ARI in the PDCCH scheduling the PDSCH of the Scell.

If the Pcell falls within case 1-1 or case 2-1 and the Scell falls within any one of cases 1-3, 1-5, 2-3 and 2-5, the UE transmits the HARQ-ACK feedback information on antenna 0 using CH_1 resource and transmits the HARQ-ACK feedback information repeatedly on antenna 1 using CH_2 resource, as shown in table 3.

TABLE 3

Channel resources mapping table supporting channel selection and SORTD transmit diversity

|  |  | Channel resources |
|---|---|---|
| Antenna 0 | Pcell | CH_1 of Pcell |
|  | Scell | CH_1 of Scell |
| Antenna 1 | Pcell | CH_2 of Pcell |
|  | Scell | CH_2 of Scell |

If the Pcell falls within case 1-2 or case 2-2 and the Scell falls within any one of cases 1-4, 1-6, 2-4 and 2-6, suppose that ch_a, ch_b, ch_c, ch_d are channels which are used during channel selection when the SORTD is not adopted.

Then, a channel resources mapping manner supporting channel selection and SORTD transmit diversity is as follows.

The UE transmits the HARQ-ACK feedback information on antenna 0 using CH_1 and CH_3 and transmits the HARQ-ACK feedback information repeatedly on antenna 1 using CH_2 and CH_4, as shown in table 4

TABLE 4

Channel resources mapping table supporting channel selection and SORTD transmit diversity

|  |  | Channel during channel selection | Channel resources mapped |
|---|---|---|---|
| Antenna 0 | Pcell | ch_a | CH_1 of Pcell |
|  |  | ch_b | CH_3 of Pcell |
|  | Scell | ch_c | CH_1 of Scell |
|  |  | ch_d | CH_3 of Scell |
| Antenna 1 | Pcell | ch_a | CH_2 of Pcell |
|  |  | ch_b | CH_4 of Pcell |
|  | Scell | ch_c | CH_2 of Scell |
|  |  | ch_d | CH_4 of Scell |

Another channel resources mapping method supporting channel selection and SORTD transmit diversity is as follows.

The UE transmits the HARQ-ACK feedback information on antenna 0 using CH_1 and CH_2 and transmits the HARQ-ACK feedback information repeatedly on antenna 1 using CH_3 and CH_4, as shown in table 5.

TABLE 5

Channel resources mapping table supporting channel selection and SORTD transmit diversity

|  |  | Channel during channel selection | Channel resources mapped |
|---|---|---|---|
| Antenna 0 | Pcell | ch_a | CH_1 of Pcell |
|  |  | ch_b | CH_2 of Pcell |
|  | Scell | ch_c | CH_1 of Scell |
|  |  | ch_d | CH_2 of Scell |
| Antenna 1 | Pcell | ch_a | CH_3 of Pcell |
|  |  | ch_b | CH_4 of Pcell |
|  | Scell | ch_c | CH_3 of Scell |
|  |  | ch_d | CH_4 of Scell |

Another channel resources mapping method supporting channel selection and SORTD transmit diversity is as follows.

The UE transmits the HARQ-ACK feedback information on antenna 0 using CH_1 and CH_3 and transmits the HARQ-ACK feedback information repeatedly on antenna 1 using CH_2 and CH_4, as shown in table 6.

TABLE 6

Channel resources mapping table supporting channel selection and SORTD transmit diversity

|  |  | Channel during channel selection | Channel resources mapped |
|---|---|---|---|
| Antenna 0 | Pcell | ch_a | CH_1 of Pcell |
|  |  | ch_b | CH_3 of Pcell |
|  | Scell | ch_c | CH_3 of Scell |
|  |  | ch_d | CH_1 of Scell |
| Antenna 1 | Pcell | ch_a | CH_2 of Pcell |
|  |  | ch_b | CH_4 of Pcell |
|  | Scell | ch_c | CH_4 of Scell |
|  |  | ch_d | CH_2 of Scell |

If the Pcell falls within case 1-1 or case 2-1 and the Scell falls within any one of cases 1-4, 1-6, 2-4 and 2-6, the Pcell is referred to as Cell_2, the Scell is referred to as Cell_1. If the Pcell falls within case 1-2 or case 2-2 and the Scell falls within any one of case 1-3, 1-5, 2-3 and 2-5, the Pcell is referred to as Cell 1 and the Scell is referred to as Cell_2. At this time, there are the following three kinds of channel resources mapping methods supporting channel selection and SORTD transmit diversity as shown in tables 7-9. In particular, one channel resources mapping method supporting channel selection and SORTD transmit diversity is as follows.

The UE transmits the HARQ-ACK feedback information on antenna 0 using CH_1 and CH_3 and transmits the HARQ-ACK feedback information repeatedly on antenna 1 using CH_2 and CH_4, as shown in table 7.

TABLE 7

Channel resources mapping table supporting channel selection and SORTD transmit diversity

|  |  | Channel during channel selection | Channel resources mapped |
|---|---|---|---|
| Antenna 1 | Cell_1 | ch_a | CH_1 of Cell_1 |
|  |  | ch_b | CH_3 of Cell_1 |
|  | Cell_2 | ch_c | CH_1 of Cell_2 |
| Antenna 2 | Cell_1 | ch_a | CH_2 of Cell_1 |
|  |  | ch_b | CH_4 of Cell_1 |
|  | Cell_2 | ch_c | CH_2 of Cell_2 |

Another channel resources mapping method supporting channel selection and SORTD transmit diversity is as follows.

The UE transmits the HARQ-ACK feedback information on antenna 0 using CH_1 and CH_2 and transmits the HARQ-ACK feedback information repeatedly on antenna 1 using CH_3 and CH_4, as shown in table 8.

TABLE 8

Channel resources mapping table supporting channel selection and SORTD transmit diversity

|  |  | Channel during channel selection | Channel resources mapped |
|---|---|---|---|
| Antenna 1 | Cell_1 | ch_a | CH_1 of Cell_1 |
|  |  | ch_b | CH_2 of Cell_1 |
|  | Cell_2 | ch_c | CH_1 of Cell_2 |
| Antenna 2 | Cell_1 | ch_a | CH_3 of Cell_1 |
|  |  | ch_b | CH_4 of Cell_1 |
|  | Cell_2 | ch_c | CH_2 of Cell_2 |

Another channel resources mapping method supporting channel selection and SORTD transmit diversity is as follows.

The UE transmits the HARQ-ACK feedback information on antenna 0 using CH_1 and CH_3 and transmits the HARQ-ACK feedback information repeatedly on antenna 1 using CH_2 and CH_4, as shown in table 9.

TABLE 9

Channel resources mapping table supporting channel selection and SORTD transmit diversity

|  |  | Channel during channel selection | Channel resources mapped |
|---|---|---|---|
| Antenna 1 | Cell _1 | ch_a | CH_3 of Cell_1 |
|  |  | ch_b | CH_1 of Cell_1 |
|  | Cell_2 | ch_c | CH_1 of Cell_2 |
| Antenna 2 | Cell _1 | ch_a | CH_4 of Cell_1 |
|  |  | ch_b | CH_2 of Cell_1 |
|  | Cell_2 | ch_c | CH_2 of Cell_2 |

Case 3:

If the UE is configured with the TDD working manner and the number of elements in the DAS of the CC is 2, the UE obtains at most 4 PUCCH 1a/1b channel resources of each CC according to the specific indication information.

Case 3-1:

If the CC is a Pcell, the CC requires 4 PUCCH 1a/1b channel resources to transmit the HARQ-ACK feedback information, denoted by CH_1, CH_2, CH_3 and CH_4. Subframes 0 and 1 respectively provide 2 PUCCH 1a/1b channel resources. If no Semi-Persistent Scheduling (SPS) service is configured in the subframes, the HARQ-ACK resource of CH_1 is determined according to the lowest CCE index n of the PDCCH of subframe 0 scheduling the PDSCH, the HARQ-ACK resource of CH_2 is determined according to the CCE index n+1 of the PDCCH of subframe 0 scheduling the PDSCH, the HARQ-ACK resource of CH_3 is determined according to the lowest CCE index m of the PDCCH of subframe 1 scheduling the PDSCH, and the HARQ-ACK resource of CH_4 is determined according to the CCE index m+1 of the PDCCH of subframe 1 scheduling the PDSCH. If the SPS service is configured in the subframe, 2 PUCCH 1a/1b channel resources required by the subframe are 2 HARQ-ACK resources semi-statically configured by higher layer signaling.

Case 3-2:

If the CC is a Scell, the CC requires 4 PUCCH 1a/1b channel resources to transmit the HARQ-ACK feedback information, denoted by CH_1, CH_2, CH_3 and CH_4. Subframes 0 and 1 respectively provide 2 PUCCH 1a/1b channel resources. If the PDSCH of the Scell is cross-carrier scheduled by the PDCCH of the Pcell, the HARQ-ACK resource of CH_1 is determined according to the lowest CCE index n of the PDCCH of subframe 0 scheduling the PDSCH, the HARQ-ACK resource of CH_2 is determined according to the CCE index n+1 of the PDCCH of subframe 0 scheduling the PDSCH, the HARQ-ACK resource of CH_3 is determined according to the lowest CCE index m of the PDCCH of subframe 1 scheduling the PDSCH, and the HARQ-ACK resource of CH_4 is determined according to the CCE index m+1 of the PDCCH of subframe 1 scheduling the PDSCH.

Case 3-3:

If the CC is a Scell, the CC requires 4 PUCCH 1a/1b channel resources to transmit the HARQ-ACK feedback information, denoted by CH_1, CH_2, CH_3 and CH_4. If the Scell is scheduled by itself, the method for obtaining the CH_1, CH_2, CH_3 and CH_4 is as follows: configuring multiple PUCCH 1a/1b channel resources semi-statically by higher layer signaling, and obtaining 4 PUCCH 1a/1b channel resources by mapping the multiple HARQ-ACK channels according to the ARI in the PDCCH scheduling the PDSCH of the Scell.

Case 4:

If the UE is configured with the TDD working manner and the number of elements in the DSA of the CC is 3 or 4, the UE obtains at most 4 PUCCH 1a/1b channel resources of each CC according to the specific indication information.

Case 4-1:

If the CC is a Pcell, the CC requires 4 PUCCH 1a/1b channel resources to transmit the HARQ-ACK feedback information, denoted by CH_1, CH_2, CH_3 and CH_4.

If no SPS service is configured in the cell, the HARQ-ACK resource of CH_1 is determined according to the lowest CCE index n of the PDCCH of the subframe with DAI=1 scheduling the PDSCH, the HARQ-ACK resource of CH_2 is determined according to the CCE index n+1 of the PDCCH of the subframe with DAI=1 scheduling the PDSCH, the HARQ-ACK resource of CH_3 is determined according to the lowest CCE index m of the PDCCH of the subframe with DAI=2 scheduling the PDSCH, and the HARQ-ACK resource of CH_4 is determined according to the CCE index m+1 of the PDCCH of the subframe with DAI=2 scheduling the PDSCH.

If the SPS service is configured in the subframe, 2 HARQ-ACK resources are configured by higher layers for the SPS service semi-statically. CH_1 is the first HARQ-ACK resource configured semi-statically by the higher layers for the SPS service, CH_2 is the second HARQ-ACK resource configured semi-statically by the higher layers for the SPS service. The HARQ-ACK resource of CH_3 is determined according to the lowest CCE index n of the PDCCH of the subframe with DAI=1 scheduling the PDSCH, and the HARQ-ACK resource of CH 4 is determined according to the CCE index n+1 of the PDCCH of the subframe with DAI=1 scheduling the PDSCH.

Case 4-2:

If the CC is a Scell, the CC requires 4 PUCCH 1a/1b channel resources to transmit the HARQ-ACK feedback information, denoted by CH_1, CH_2, CH_3 and CH_4. If the PDSCH of the Scell is cross-carrier scheduled by the PDCCH of the Pcell, the HARQ-ACK resource of CH_1 is determined according to the lowest CCE index n of the PDCCH of the subframe with DAI=1 scheduling the PDSCH, the HARQ-ACK resource of CH_2 is determined according to the CCE index n+1 of the PDCCH of the subframe with DAI=1 scheduling the PDSCH, the HARQ- ACK resource of CH 3 is determined according to the lowest CCE index m of the PDCCH of the subframe with DAI=2 scheduling the PDSCH, and the HARQ-ACK resource of CH_4 is determined according to the CCE index m+1 of the PDCCH of the subframe with DAI=2 scheduling the PDSCH.

Case 4-3:

If the CC is a Scell, the CC requires 4 PUCCH 1a/1b channel resources to transmit the HARQ-ACK feedback information, denoted by CH_1, CH_2, CH_3 and CH_4. If the Scell is scheduled by itself, the method for obtaining the CH_1, CH_2, CH_3 and CH_4 is as follows: configuring multiple PUCCH 1a/1b channel resources semi-statically by higher layer signaling, and obtaining 4 PUCCH 1a/1b channel resources by mapping the multiple HARQ-ACK channels according to the ARI in the PDCCH scheduling the PDSCH of the Scell.

If the Pcell falls within case 3-1 or case 4-1 and the Scell falls within any one of cases 3-2, 3-3, 4-2 and 4-3, the UE transmits the HARQ-ACK feedback information on antenna 0 using CH_1 and transmits the HARQ-ACK feedback information repeatedly on antenna 1 using CH 2, as shown in table 3.

In the cases other than the above cases, suppose that ch_a, ch_b, ch_c and ch_d are channels used during channel selection when SORTD is not used. Then, the UE transmits the HARQ-ACK feedback information on antenna 0 using CH_1 and CH_3 and transmits the HARQ-ACK feedback information repeatedly on antenna 1 using CH_2 and CH_4, as shown in table 10.

TABLE 10

Channel resources mapping table supporting channel selection and SORTD transmit diversity

|  |  | Channel during channel selection | Channel resources mapped |
|---|---|---|---|
| Antenna 0 | Pcell | ch_a | CH_1 of Pcell |
|  |  | ch_b | CH_3 of Pcell |
|  | Scell | ch_c | CH_1 of Scell |
|  |  | ch_d | CH_3 of Scell |
| Antenna 1 | Pcell | ch_a | CH_2 of Pcell |
|  |  | ch_b | CH_4 of Pcell |
|  | Scell | ch_c | CH_2 of Scell |
|  |  | ch_d | CH_4 of Scell |

Hereinafter, the present invention will be described in further detail with reference to several examples.

Example 1

Suppose that the UE is configured with the TDD and the number of elements in the DAS is 1. The UE is configured with 2 CCs, respectively are a primary CC and a secondary CC. The PDSCH of the secondary CC is cross-carrier scheduled by the PDCCH of the primary CC. The primary CC is configured with the MIMO transmission mode and the secondary CC is configured with the MIMO transmission mode. The HARQ-ACK feedback information is transmitted using PUCCH format 1b with channel selection and the SORTD transmit diversity technique is adopted.

At this time, the primary CC falls within the above case 2-2. The primary CC requires 4 PUCCH 1a/1b channel resources to transmit the HARQ-ACK feedback information, denoted by CH_1, CH_2, CH_3 and CH_4. CH_1 and CH_2 are obtained by mapping according to CCE indexes n and n+1 of the PDCCH scheduling the PDSCH. CH_3 and CH_4 are obtained through the following method: configuring multiple PUCCH 1a/1b channel resources semi-statically by higher layer signaling, and obtaining 2 PUCCH 1a/1b channel resources through mapping the multiple HARQ-ACK channels according to the ARI in the PDCCH scheduling the data transmission of the Pcell. For example, the ARI in the PDCCH scheduling the data transmission of the Pcell may be obtained through re-defining the DAI. Since the number of elements of the DAS is 1 at this time, the DAI field in the PDCCH scheduling the PDSCH is not used and may be used as the ARI by re-defining.

The secondary CC falls within the above case 2-4. The secondary CC requires 4 PUCCH 1a/1b channel resources to transmit the HARQ-ACK feedback information, denoted by CH_1, CH_2, CH_3 and CH_4. CH_1 and CH_2 are obtained by mapping according to CCE indexes n and n+1 of the PDCCH of the primary CC scheduling the PDSCH of the secondary CC. CH_3 and CH_4 are obtained through the following method: configuring multiple PUCCH 1a/1b channel resources semi-statically by higher layer signaling, and obtaining 2 PUCCH 1a/1b channel resources through mapping the multiple HARQ-ACK channels according to the ARI in the PDCCH of the Pcell scheduling the data transmission of the Scell.

The PUCCH 1a/1b channel resources mapping relationship in this example is shown in table 11.

TABLE 11

PUCCH resources mapping relationship (A = 4)

|  | Pcell | | | | Scell | | | |
|---|---|---|---|---|---|---|---|---|
|  | CH_1 | CH_2 | CH_3 | CH_4 | CH_1 | CH_2 | CH_3 | CH_4 |
| cross-carrier scheduling | n_CCE | n_CCE + 1 | ARI (DAI) | ARI (DAI) | n_CCE | n_CCE + 1 | ARI | ARI |
| Non-cross-carrier scheduling | n_CCE | n_CCE + 1 | ARI (DAI) | ARI (DAI) | ARI | ARI | ARI | ARI |

Example 2

Suppose that the UE is configured with the TDD working manner and the number of elements in the DAS is 1. The UE is configured with 2 CCs, respectively are a primary CC and a secondary CC. The PDSCH of the secondary CC is cross-carrier scheduled by the PDCCH of the primary CC. The primary CC is configured with the SIMO transmission mode and the secondary CC is configured with the SIMO transmission mode. The HARQ-ACK feedback information is transmitted using PUCCH format 1b with channel selection and the SORTD transmit diversity technique is adopted.

At this time, the primary CC falls within the above case 2-1 and requires 2 PUCCH 1a/1b channel resources to transmit the HARQ-ACK feedback information, denoted by CH_1 and CH_2. CH_1 and CH_2 are obtained by mapping according to the CCE indexes n and n+1 of the PDCCH scheduling the PDSCH.

The secondary CC falls within the above case 2-3 and requires 2 PUCCH 1a/1b channel resources to transmit HARQ-ACK feedback information, denoted by CH_1 and CH_2. CH_1 and CH_2 are obtained by mapping according to the CCE indexes n and n+1 of the PDCCH of the primary CC scheduling the PDSCH of the secondary CC.

In this example, the PUCCH 1a/1b channel resources mapping relationship is shown in table 12.

TABLE 12

| PUCCH resources mapping relationship (A = 2) | | | |
|---|---|---|---|
| Pcell | | Scell | |
| CH_1 | CH_2 | CH_1 | CH_2 |
| cross-carrier scheduling | | | |
| n_CCE | n_CCE + 1 | n_CCE | n_CCE + 1 |
| Non-cross-carrier scheduling | | | |
| n_CCE | n_CCE + 1 | ARI | ARI |

Example 3

Suppose that the UE is configured with the TDD and the number of elements in the DAS is 1. The UE is configured with 2 CCs, respectively are a primary CC and a secondary CC. The PDSCH of the secondary CC is scheduled by the PDCCH of the secondary CC. The primary CC is configured with the MIMO transmission mode and the secondary CC is configured with the SIMO transmission mode. The HARQ-ACK feedback information is transmitted using PUCCH format 1b with channel selection and the SORTD transmit diversity technique is adopted.

At this time, the primary CC falls within the above case 2-2 and requires 4 PUCCH 1a/1b channel resources to transmit the HARQ-ACK feedback information, denoted by CH_1, CH_2, CH_3 and CH_4. CH_1 and CH_2 are obtained by mapping according to the CCE indexes n and n+1 of the PDCCH scheduling the PDSCH. The method for obtaining the CH_3 and CH_4 is as follows: configuring multiple PUCCH 1a/1b channel resources semi-statically by higher layer signaling, and obtaining 2 PUCCH 1a/1b channel resources through mapping the multiple HARQ-ACK channels according to the ARI in the PDCCH scheduling the data transmission of the Pcell. For example, the ARI in the PDCCH scheduling the data transmission of the Pcell may be obtained through re-defining the DAI. Since the number of elements of the DAS at this time is 1, the DAI in the PDCCH scheduling the PDSCH is not defined. Therefore, the DAI field may be re-defined to be used as the ARI.

The secondary CC falls within the above case 2-5 and requires 2 PUCCH 1a/1b channels resources to transmit the HARQ-ACK feedback information, denoted by CH_1 and CH_2. CH_1 and CH_2 are obtained as follows: configuring multiple PUCCH 1a/1b channel resources semi-statically by higher layer signaling, and obtaining 2 PUCCH 1a/1b channel resources through mapping the multiple HARQ-ACK channels according to the ARI in the PDCCH scheduling the PDSCH of the Scell.

In this example, the PUCCH 1a/1b channel resources mapping relationship is shown in table 13.

TABLE 13

| PUCCH resources mapping relationship (A = 3) | | | | | |
|---|---|---|---|---|---|
| Pcell (MIMO) | | | | Scell (SIMO) | |
| CH_1 | CH_2 | CH_3 | CH_4 | CH_1 | CH_2 |
| cross-carrier scheduling | | | | | |
| n_CCE | n_CCE + 1 | ARI (DAI) | ARI (DAI) | n_CCE | n_CCE + 1 |
| Non-cross-carrier scheduling | | | | | |
| n_CCE | n_CCE + 1 | ARI (DAI) | ARI (DAI) | ARI | ARI |

In this example, if the primary CC is configured with the SIMO transmission mode and the secondary CC is configured with the MIMO transmission mode, the PUCCH 1a/1b channel resources mapping relationship is shown in table 14.

TABLE 14

| PUCCH resources mapping relationship (A = 3) | | | | | |
|---|---|---|---|---|---|
| Scell (MIMO) | | | | Pcell (SIMO) | |
| CH_1 | CH_2 | CH_3 | CH_4 | CH_1 | CH_2 |
| cross-carrier scheduling | | | | | |
| n_CCE | n_CCE + 1 | ARI | ARI | n_CCE | n_CCE + 1 |
| Non-cross-carrier scheduling | | | | | |
| n_CCE | n_CCE + 1 | ARI | ARI | n_CCE | n_CCE + 1 |

Example 4

Suppose that the UE is configured with the TDD and the number of elements in the DAS is 2. The HARQ-ACK feedback information is transmitted using PUCCH format 1b with channel selection and the SORTD transmit diversity technique is adopted.

The primary CC is configured with the MIMO transmission mode and requires 4 PUCCH 1a/1b channel resources to transmit the HARQ-ACK feedback information, denoted by CH_1, CH_2, CH_3 and CH_4. Subframes 0 and 1 respectively provide 2 PUCCH 1a/1b channel resources. If no SPS service is configured in the subframes, the HARQ-ACK resource of CH 1 is determined according to the lowest CCE index n of the PDCCH of subframe 0 scheduling the PDSCH, the HARQ-ACK resource of CH_2 is determined according to the CCE index n+1 of the PDCCH of subframe 0 scheduling the PDSCH, the HARQ-ACK resource of CH_3 is determined according to the lowest CCE index m of the PDCCH of subframe 1 scheduling the PDSCH, and the HARQ-ACK resource of CH_4 is determined according to the CCE index m+1 of the PDCCH of subframe 1 scheduling the PDSCH. If the SPS service is configured in the subframe, 2 PUCCH 1a/1b channel resources required by the subframe are 2 HARQ-ACK resources semi-statically configured by higher layer signaling.

The secondary CC is configured with the MIMO transmission mode. PUCCH format 1b with channel selection is adopted to transmit the HARQ-ACK feedback information and the SORTD transmit diversity is adopted. The secondary CC requires 4 PUCCH 1a/1b channel resources to transmit the HARQ-ACK feedback information, denoted by CH_1, CH_2, CH_3 and CH_4. Subframes 0 and 1 respectively provide 2 PUCCH 1a/1b channel resources. If the PDSCH of the Scell is cross-carrier scheduled by the PDCCH of the Pcell, the HARQ-ACK resource of CH 1 is determined according to the lowest CCE index n of the PDCCH of subframe 0 scheduling the PDSCH, the HARQ-ACK resource of CH_2 is determined according to the CCE index n+1 of the PDCCH of subframe 0 scheduling the PDSCH, the HARQ-ACK resource of CH_3 is determined according to the lowest CCE index m of the PDCCH of subframe 1 scheduling the PDSCH, and the HARQ-ACK resource of CH_4 is determined according to the CCE index m+1 of the PDCCH of subframe 1 scheduling the PDSCH.

If the Scell is scheduled by itself, the method for obtaining CH_1, CH_2, CH_3 and CH_4 is as follows: configuring multiple PUCCH 1a/1b channel resources semi-statically by higher layer signaling, and obtaining 4 PUCCH 1a/1b channel resources through mapping multiple HARQ-ACK channels according to the ARI in the PDCCH scheduling the PDSCH of the Scell.

In this example, the PUCCH 1a/1b channel resources mapping relationship is shown in table 15.

ACK resource of CH_3 is determined according to the lowest CCE index m of the PDCCH of the subframe with DAI=2 scheduling the PDSCH, and the HARQ-ACK resource of CH_4 is determined according to the CCE index m+1 of the PDCCH of the subframe with DAI=2 scheduling the PDSCH. If the SPS service is configured in the subframe, 2 HARQ-ACK resources are configured by higher layers semi-statically for the SPS service, wherein CH_1 is the HARQ-ACK resource of the first HARQ-ACK resource configured semi-statically for the SPS service by higher layers, CH_2 is the HARQ-ACK resource of the first HARQ-ACK resource configured semi-statically for the SPS service by higher layers, the HARQ-ACK resource of CH_3 is determined according to the lowest CCE index n of the PDCCH of the subframe with DAI=1 scheduling the PDSCH, and the HARQ-ACK resource of CH_4 is determined according to the CCE index n+1 of the PDCCH of the subframe with DAI=1 scheduling the PDSCH.

As to the secondary CC, 4 PUCCH 1a/1b channel resources are required to transmit the HARQ-ACK feedback information, denoted by CH_1, CH_2, CH_3 and CH_4. If the PDSCH of the Scell is cross-carrier scheduled by the PDCCH of the Pcell, the HARQ-ACK resource of CH 1 is determined according to the lowest CCE index n of the PDCCH of the subframe with DAI=1 scheduling the PDSCH, the HARQ-ACK resource of CH_2 is determined according to the CCE index n+1 of the PDCCH of the subframe with DAI=1 scheduling the PDSCH, the HARQ-ACK resource of CH_3 is determined according to the lowest CCE index m of the PDCCH of the subframe with DAI=2 scheduling the PDSCH, and the HARQ-ACK

TABLE 15

PUCCH resources mapping relationship (M = 2)

| | Pcell | | | | Scell | | | |
|---|---|---|---|---|---|---|---|---|
| | CH_1 | CH_2 | CH_3 | CH_4 | CH_1 | CH_2 | CH_3 | CH_4 |
| cross-carrier scheduling | n_CCE or the first SPS resource | n_CCE+1 or the second SPS resource | m_CCE | m_CCE+1 | n_CCE | n_CCE +1 | m_CCE | m_CCE+1 |
| Non-cross-carrier scheduling | n_CCE or the first SPS resource | n_CCE+1 or the second SPS resource | m_CCE | m_CCE+1 | ARI | ARI | ARI | ARI |

Example 5

Suppose that the UE is configured with the TDD working manner and the number of elements in the DAS is 3 or 4. The HARQ-ACK feedback information is transmitted using PUCCH format 1b with channel selection and the SORTD transmit diversity technique is adopted.

As to the primary CC, 4 PUCCH 1a/1b channel resources are required to transmit the HARQ-ACK feedback information, denoted by CH_1, CH_2, CH_3 and CH_4. If no SPS service is configured in one cell, the HARQ-ACK resource of CH_1 is determined according to the lowest CCE index n of the PDCCH of the subframe with DAI=1 scheduling the PDSCH, the HARQ-ACK resource of CH_2 is determined according to the CCE index n+1 of the PDCCH of the subframe with DAI=1 scheduling the PDSCH, the HARQresource of CH 4 is determined according to the CCE index m+1 of the PDCCH of the subframe with DAI=2 scheduling the PDSCH. Herein, the lowest CCE index of the PDCCH of subframe with DAI=1 scheduling the PDSCH is denoted by n, the lowest CCE index of the PDCCH of subframe with DAI=2 scheduling the PDSCH.

If the Scell is scheduled by itself, the method for obtaining CH_1, CH_2, CH_3 and CH_4 is as follows: configuring multiple PUCCH 1a/1b channel resources semi-statically by higher layer signaling, and obtaining 4 PUCCH 1a/1b channel resources through mapping multiple HARQ-ACK channels according to the ARI in the PDCCH scheduling the PDSCH of the Scell.

In this example, the PUCCH 1a/1b channel resources mapping relationship is as shown in table 16.

TABLE 16

PUCCH resources mapping relationship (M = 3, 4)

| | Pcell | | | | Scell | | | |
|---|---|---|---|---|---|---|---|---|
| | CH_1 | CH_2 | CH_3 | CH_4 | CH_1 | CH_2 | CH_3 | CH_4 |
| cross-carrier scheduling | n_CCE or the first SPS resource | n_CCE+1 or the second SPS resource | m_CCE | m_CCE+1 | n_CCE | n_CCE +1 | m_CCE | m_CCE+1 |
| Non-cross-carrier scheduling | n_CCE or the first SPS resource | n_CCE+1 or the second SPS resource | m_CCE | m_CCE+1 | ARI | ARI | ARI | ARI |

It can be seen from the above technical solution that, according to the method for allocating HARQ-ACK channel resources provided by the examples of the present invention, it is possible to allocate HARQ-ACK channel resources to the UE reasonably and avoid waste of channel resources in the premise that channel selection and SORTD technique are supported.

Figure 4:
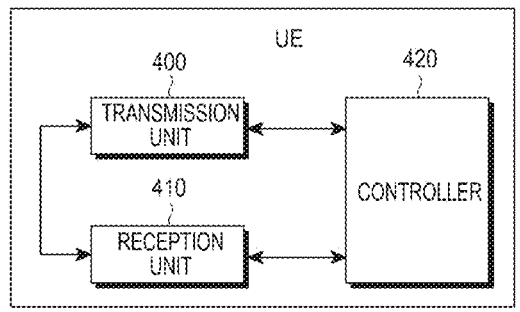
FIG. 4 is illustrating the UE apparatus according to an exemplary embodiment of the present invention.

FIG. 4 is illustrating the UE apparatus according to an exemplary embodiment of the present invention.

Referring to FIG. 4, the UE includes transmission unit (400), reception unit (410), and controller (420). The transmission unit (400) and reception unit (410) respectively include a transmission module and a reception module for communicating with the Node B according to an exemplary embodiment of the present invention. The reception unit (410) receives PDCCH information and PDSCH data from a base station through two CCs from a Node B.

The controller (420) obtains according to specific indication information, PUCCH channel resources required for transmitting HARQ-ACK feedback information using a transmit diversity technique.

The transmission unit (400) transmits HARQ-ACK feedback information on the obtained PUCCH channel resources adopting the transmit diversity technique.

Figure 5:
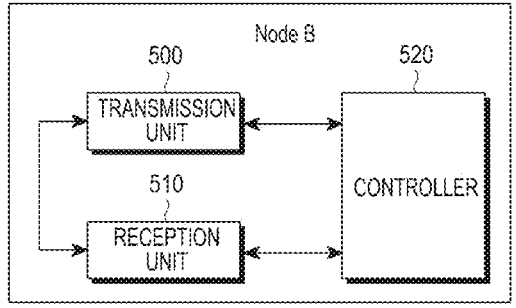
FIG. 5 is illustrating the Node B apparatus according to an exemplary embodiment of the present invention.

FIG. 5 is illustrating the Node B apparatus according to an exemplary embodiment of the present invention.

Referring to FIG. 5, the Node B includes transmission unit (500), reception unit (510), and controller (520). The transmission unit (500) and reception unit (510) respectively include a transmission module and a reception module for communicating with the UE according to an exemplary embodiment of the present invention. For example, the transmission unit (500) transmits PDCCH information and PDSCH data from a base station through two CCs from a Node B.

The controller (520) performs an operation of the Node B based on FIG. 3 according to an exemplary embodiment of the present invention.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

What is claimed is:

1. A method for transmitting hybrid automatic repeat request acknowledgement (HARQ-ACK) feedback information by a user equipment (UE) in a wireless communication system, the method comprising:

determining a number of HARQ-ACK bits based on a number of serving cells and a downlink transmission mode for each of the serving cells, the downlink transmission mode including one of a first transmission mode that supports one transport block and a second transmission mode that supports up to two transport blocks; and performing HARQ-ACK transmission based on the HARQ-ACK bits using uplink resources on two antenna ports, wherein the uplink resources include a first uplink resource mapped to a first antenna port of the two antenna ports and a second uplink resource mapped to a second antenna port of the two antenna ports, wherein the first uplink resource is associated with a physical downlink shared channel (PDSCH) transmission indicated by a physical downlink control channel (PDCCH) on a primary cell among the serving cells, and the first uplink resource is obtained based on a number of a lowest control channel element (CCE) used for transmission of the PDCCH, and wherein the second uplink resource is configured by higher layers.

2. The method of claim 1, wherein a number of the uplink resources is corresponded to the number of the HARQ-ACK bits.

3. The method of claim 1, wherein an HARQ-ACK bit included in the HARQ-ACK bits represents a response for a transport block associated with one of the serving cells.

4. The method of claim 1, wherein the performing of the HARQ-ACK transmission comprises transmitting same HARQ-ACK feedback information on the two antenna ports.

5. The method of claim 1, wherein the HARQ-ACK transmission is performed based on one of a frequency division duplexing (FDD) scheme and a time division duplexing (TDD) scheme.

6. A method for receiving hybrid automatic repeat request acknowledgement (HARQ-ACK) feedback information by a base station (BS) in a wireless communication system, comprising:

receiving HARQ-ACK feedback information based on HARQ-ACK bits from a user equipment (UE), wherein the HARQ-ACK feedback information is transmitted from the UE using uplink resources on two antenna ports of the UE, wherein a number of the HARQ-ACK bits is determined based on a number of serving cells for the UE and a transmission mode for each of the serving cells, the transmission mode including one of a first transmission mode that supports one transport block and a second transmission mode that supports up to two transport blocks, wherein the uplink resources include a first uplink resource mapped to a first antenna port of the two antenna ports and a second uplink resource mapped to a second antenna port of the two antenna ports, wherein the first uplink resource is associated with a physical downlink shared channel (PDSCH) transmission indicated by a physical downlink control channel (PDCCH) on a primary cell among the serving cells, and the first uplink resource is obtained based on a number of a lowest control channel element (CCE) used for transmission of the PDCCH, and wherein the second uplink resource is configured by higher layers.

7. The method of claim 6, wherein a number of the uplink resources is corresponded to the number of the HARQ-ACK bits.

8. The method of claim 6, wherein an HARQ-ACK bit included in the HARQ-ACK bits represents a response for a transport block associated with one of the serving cells.

9. The method of claim 6, wherein same HARQ-ACK feedback information is transmitted on the two antenna ports.

10. The method of claim 6, wherein the HARQ-ACK feedback information is transmitted based on one of a frequency division duplexing (FDD) scheme and a time division duplexing (TDD) scheme.

11. A user equipment (UE) in a wireless communication system, comprising:
a transceiver; and
at least one processor configured to:
determine a number of hybrid automatic repeat request acknowledgement (HARQ-ACK) bits based on a number of serving cells and a downlink transmission mode for each of the serving cells, the downlink transmission mode including one of a first transmission mode that supports one transport block and a second transmission mode that supports up to two transport blocks,
control the transceiver to perform a HARQ-ACK transmission based on the HARQ-ACK bits using uplink resources on two antenna ports,
wherein the uplink resources include a first uplink resource mapped to a first antenna port of the two antenna ports and a second uplink resource mapped to a second antenna port of the two antenna ports,
wherein the first uplink resource is associated with a physical downlink shared channel (PDSCH) transmission indicated by a physical downlink control channel (PDCCH) on a primary cell among the serving cells, and the first uplink resource is obtained based on a number of a lowest control channel element (CCE) used for transmission of the PDCCH, and
wherein the second uplink resource is configured by higher layers.

12. The UE of claim 11, wherein a number of the uplink resources is corresponded to the number of the HARQ-ACK bits.

13. The UE of claim 11, wherein an HARQ-ACK bit included in the HARQ-ACK bits represents a response for a transport block associated with one of the serving cells.

14. The UE of claim 11, wherein the at least one processor is further configured to control the transceiver to transmit same HARQ-ACK feedback information on the two antenna ports.

15. The UE of claim 11, wherein the HARQ-ACK transmission is performed based on one of a frequency division duplexing (FDD) scheme and a time division duplexing (TDD) scheme.

16. A base station (BS) in a wireless communication system, comprising:
a transceiver; and
at least one processor configured to control the transceiver to receive hybrid automatic repeat request acknowledgement (HARQ-ACK) feedback information based on HARQ-ACK bits from a user equipment (UE),
wherein the HARQ-ACK feedback information is transmitted from the UE using uplink resources on two antenna ports of the UE,
wherein a number of the HARQ-ACK bits is determined based on a number of serving cells for the UE and a transmission mode for each of the serving cells, the transmission mode including one of a first transmission mode that supports one transport block and a second transmission mode that supports up to two transport blocks,
wherein the uplink resources include a first uplink resource mapped to a first antenna port of the two antenna ports and a second uplink resource mapped to a second antenna port of the two antenna ports,
wherein the first uplink resource is associated with a physical downlink shared channel (PDSCH) transmission indicated by a physical downlink control channel (PDCCH) on a primary cell among the serving cells, and the first uplink resource is obtained based on a number of a lowest control channel element (CCE) used for transmission of the PDCCH, and
wherein the second uplink resource is configured by higher layers.

17. The BS of claim 16, wherein a number of the uplink resources is corresponded to the number of the HARQ-ACK bits.

18. The BS of claim 16, wherein an HARQ-ACK bit included in the HARQ-ACK bits represents a response for a transport block associated with one of the serving cells.

19. The BS of claim 16, wherein same HARQ-ACK feedback information is transmitted on the two antenna ports.

20. The BS of claim 16, wherein the HARQ-ACK feedback information is transmitted based on one of a frequency division duplexing (FDD) scheme and a time division duplexing (TDD) scheme.

* * * * *